United States Patent
Yoshida et al.

(10) Patent No.: US 8,329,351 B2
(45) Date of Patent: Dec. 11, 2012

(54) FUEL CELL SYSTEM

(75) Inventors: Michio Yoshida, Nishikamo-gum (JP); Kenji Umayahara, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 359 days.

(21) Appl. No.: 12/740,220

(22) PCT Filed: Sep. 4, 2008

(86) PCT No.: PCT/JP2008/065996
§ 371 (c)(1),
(2), (4) Date: Apr. 28, 2010

(87) PCT Pub. No.: WO2009/057383
PCT Pub. Date: May 7, 2009

(65) Prior Publication Data
US 2010/0233556 A1    Sep. 16, 2010

(30) Foreign Application Priority Data

Oct. 29, 2007  (JP) ................................ 2007-280105

(51) Int. Cl.
*H01M 8/04* (2006.01)
(52) U.S. Cl. ........ 429/432; 429/428; 429/430; 700/286; 700/297
(58) Field of Classification Search .................. 429/428, 429/430–432; 700/286, 297
See application file for complete search history.

(56) References Cited

U.S. PATENT DOCUMENTS

| | | | |
|---|---|---|---|
| 6,781,333 B2* | 8/2004 | Koide et al. ................... | 318/432 |
| 2003/0012989 A1* | 1/2003 | Ueda et al. ...................... | 429/22 |
| 2006/0006832 A1* | 1/2006 | Kitajima et al. .............. | 318/800 |
| 2009/0108798 A1* | 4/2009 | Schulz et al. ................. | 318/802 |

FOREIGN PATENT DOCUMENTS

| | | | |
|---|---|---|---|
| EP | 1731350 A1 * | 12/2006 | |
| JP | 2004-063338 A | 2/2004 | |
| JP | 2004-320039 A | 11/2006 | |
| JP | 2007-109469 A | 4/2007 | |
| JP | 2007-109569 A | 4/2007 | |
| WO | WO 2006120822 A1 * | 11/2006 | |
| WO | WO 2007064317 A1 * | 6/2007 | |

* cited by examiner

*Primary Examiner* — Gregg Cantelmo
(74) *Attorney, Agent, or Firm* — Kenyon & Kenyon LLP

(57) ABSTRACT

There is provided a fuel cell system capable of suppressing the increase of a control error of a motor. The system includes a fuel cell which generates a power by an electrochemical reaction between a fuel gas and an oxidizing gas, a motor driven by the generated power of the fuel cell, and a control unit which controls the generation state of the fuel cell. The control unit performs high-potential avoiding control to prevent the total voltage of the fuel cell from exceeding a predetermined high-potential avoiding voltage threshold value. In a vehicle velocity region where the control switching of the traction motor is caused, the high-potential avoiding volume is inhibited.

5 Claims, 3 Drawing Sheets

FUEL CELL SYSTEM

This is a 371 national phase application of PCT/JP2008/065996 filed 4 Sep. 2008, which claims priority to Japanese Patent Application No. 2007-280105 filed 29 Oct. 2007, the contents of which are incorporated herein by reference.

TECHNICAL FIELD

The present invention relates to a fuel cell system. More particularly, it relates to a fuel cell system in which a motor is driven by a power voltage generated by a fuel cell.

BACKGROUND ART

In recent years, a fuel cell system has received attention in which a fuel cell for generating a power by an electrochemical reaction between a fuel gas and an oxidizing gas is used as an energy source. In the fuel cell system, a high pressure fuel gas is supplied from a fuel tank to a fuel cell anode, and air as the oxidizing gas is pressurized and supplied to a cathode, thereby causing the electrochemical reaction between the fuel gas and the oxidizing gas to generate an electromotive force.

In such a fuel cell system, to suppress the promotion of the deterioration of the fuel cell, control (hereinafter referred to as "the high-potential avoiding control") is performed so as to prevent the voltage of the fuel cell from exceeding a predetermined threshold value on predetermined conditions (e.g., see Patent Document 1).

Patent Document 1: Japanese Patent Application Laid-Open No. 2007-109569

DISCLOSURE OF THE INVENTION

Problem to be solved by the Invention

Meanwhile, when a fuel cell system is used as a car-mounted power generation system for a vehicle, a traction motor (driving motor) control system (e.g., PWM current control, rectangular wave voltage control, overmodulation current control) is switched in accordance with a vehicle velocity (or a motor rotation number) and an inverter voltage for controlling the traction motor.

When the above high-potential avoiding control is applied to such a fuel cell system, the output voltage of a fuel cell fluctuates owing to the switching on/off of this high-potential avoiding control, and accordingly the inverter voltage for controlling the traction motor also fluctuates. Moreover, when the control system of the traction motor switches owing to the fluctuation of the inverter voltage, the control error of the traction motor increases.

In such a case, when a power generated by the fuel cell during the high-potential avoiding control cannot completely be consumed by an auxiliary device, a surplus power is charged into a secondary battery. When such a constitution is employed, the overcharge of the secondary battery might be caused. In particular, during the regeneration of the power for the secondary battery, the overcharge is easily caused. Furthermore, the above control error might cause the over-discharge of the secondary battery.

To solve the problem, an object of the present invention is to provide a fuel cell system capable of suppressing the increase of the control error of a motor.

Means for solving the Problem

A fuel cell system of the present invention is a fuel cell system including: a fuel cell which generates a power by an electrochemical reaction between a fuel gas and an oxidizing gas; a capacitor in which the power generated by the fuel cell is charged; a motor driven by at least one of the generated power of the fuel cell and the power charged in the capacitor; an inverter to control the motor in a plurality of control systems which switch on predetermined conditions; a converter which raises a voltage input from the capacitor to output, the voltage to the motor through the inverter and which lowers a voltage input from the fuel cell to output the voltage to the capacitor; and a control unit which controls a converter command voltage and an inverter command voltage, wherein the control unit performs high-potential avoiding control to keep the converter command voltage as a high-potential avoiding voltage which is lower than the open voltage of the fuel cell, thereby preventing the total voltage of the fuel cell from exceeding a predetermined high-potential avoiding voltage threshold value, whereas the control unit inhibits the high-potential avoiding control on conditions that the control system of the motor switches.

According to such a constitution, even on conditions that the control system of the motor switches, the performance of the high-potential avoiding control is forcibly inhibited, thereby eventually suppressing the fluctuation of the output voltage of the fuel cell accompanying the on/off operation of the high-potential avoiding control. Therefore, the control system of the motor does not switch owing to the influence of the fluctuation, and the increase of the control error of the motor can be suppressed.

The control system of the motor may switch in accordance with, for example, the rotation number or torque of the motor, and the inverter command voltage.

In such a case, the control unit may inhibit the high-potential avoiding control when the rotation number of the motor is a predetermined rotation number or more (with the proviso that this predetermined rotation number fluctuates in accordance with the inverter command voltage). Moreover, in a case where the fuel cell system is mounted in a car, when a vehicle velocity is a predetermined vehicle velocity or more, the control unit may inhibit the high-potential avoiding control.

Effect of the Invention

According to a fuel cell system of the present invention, it is possible to suppress the increase of the control error of a motor driven by a power voltage generated by a fuel cell.

BEST MODE FOR CARRYING OUT THE INVENTION

Hereinafter, an embodiment of the present invention will be described with reference to the drawings.

Figure 1:
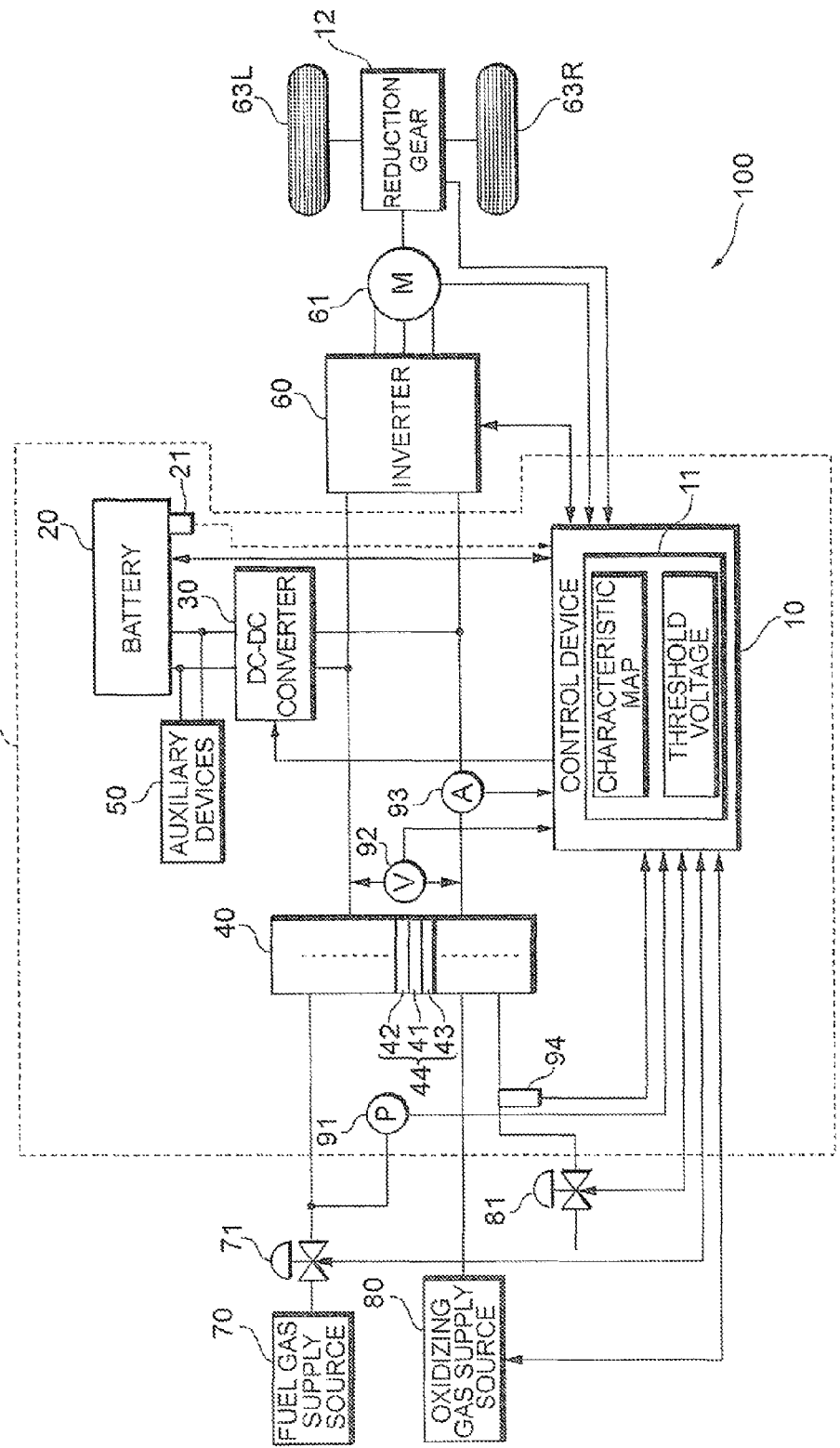
FIG. 1 is a system constitution diagram schematically showing a fuel cell system according to one embodiment of the present invention.

FIG. 1 is a diagram showing a constitution of a main part of a fuel cell system 100 according to the present embodiment. In the present embodiment, there is assumed a fuel cell system mounted in a vehicle such as a fuel cell hybrid vehicle (FCHV), an electric car or a hybrid car, but the present invention may be applied to not only the vehicle but also various mobile bodies (e.g., a two-wheeled vehicle, a ship, an airplane, a robot, etc.). Furthermore, the present invention is applicable to not only the fuel cell system mounted in the mobile body but also a stational fuel cell system or a portable fuel cell system.

This vehicle runs by using, as a driving force source, a traction motor 61 connected to wheels 63L, 63R via a reduction gear 12. A power source of the traction motor 61 is a power source system 1. A direct current output from the power source system 1 is converted into a three-phase alternate current by an inverter 60, and supplied to the traction motor 61. The traction motor 61 can function as a power generator during braking. The power source system 1 is constituted of a fuel cell 40, a battery (a capacitor) 20, a DC/DC converter (a converter) 30 and the like.

The fuel cell 40 is means for generating a power from a supplied reactant gas (a fuel gas and an oxidizing gas), and various types of fuel cells such as a solid polymer type, a phosphoric acid type and a molten carbonate type may be utilized. The fuel cell 40 includes a polymer electrolyte membrane 41 which is a proton conductive type ion exchange membrane made of a fluorocarbon resin or the like, and the surface of the polymer electrolyte membrane is coated with a platinum catalyst (an electrode catalyst).

It is to be noted that as the catalyst which coats the polymer electrolyte membrane 41, not only the platinum catalyst but also a platinum cobalt catalyst (hereinafter referred to simply as the catalyst) may be applied. Each of unitary cells of the fuel cell 40 include a membrane-electrode assembly 44 obtained by disposing an anode pole 42 and a cathode pole 43 on both faces of the polymer electrolyte membrane 41 by screen printing or the like. The fuel cell 40 has a stack structure in which a plurality of unitary cells are stacked in series.

The output voltage (hereinafter referred to as the FC voltage) and the output current (hereinafter referred to as the FC current) of the fuel cell 40 are detected by a voltage sensor 92 and a current sensor 93, respectively. A fuel gas such as a hydrogen gas is supplied from a fuel gas supply source 70 to a fuel pole (the anode) of the fuel cell 40, whereas an oxidizing gas such as air is supplied from an oxidizing gas supply source 80 to an oxygen pole (the cathode).

The fuel gas supply source 70 is constituted of, for example, a hydrogen tank, various valves and the like, and a valve open degree, an ON/OFF time or the like is regulated to control the amount of the fuel gas to be supplied to the fuel cell 40.

The oxidizing gas supply source 80 is constituted of, for example, an air compressor, a motor for driving the air compressor, an inverter and the like, and the rotation number of the motor or the like is regulated to regulate the amount of the oxidizing gas to be supplied to the fuel cell 40.

The battery 20 is a chargeable/dischargeable secondary battery, and is, for example, a nickel hydrogen battery or the like. Needless to say, instead of the battery 20, any chargeable/dischargeable accumulator (e.g., the capacitor) other than the secondary battery may be provided. This battery 20 is inserted into a discharge path of the fuel cell 40, and connected in parallel with the fuel cell 40. The battery 20 and the fuel cell 40 are connected in parallel with the inverter 60 for the traction motor, and the DC/DC converter 30 is provided between the battery 20 and the inverter 6.

The inverter 60 is constituted of, for example, a plurality of switching elements, and converts a direct-current power output from the fuel cell 40 or the battery 20 into a three-phase alternate-current power in accordance with a control command given from a control device 10 to supply the power to the traction motor 61. The traction motor 61 is a motor for driving the wheels 63L, 63R, and the rotation number of such a motor is controlled by the inverter 60.

Moreover, the control device 10 switches the control system of the inverter 60 from PWM control to overmodulation control or from the overmodulation control to rectangular control, as the rotation number of the traction motor 61 increases, in accordance with an inverter command voltage and the rotation number and torque of the traction motor 61 as shown in FIGS. 2 to 6.

More specifically, when the inverter command voltage is equal and the rotation number of the traction motor 61 is a predetermined rotation number or more, in other words, a vehicle velocity is a predetermined vehicle velocity or more, the control system switches from the PWM control in a first region Z1 on a low vehicle velocity side to the overmodulation control in a second region Z2 on a higher vehicle velocity side and the rectangular control in a third region Z3 on a still higher vehicle velocity side in this order.

Figure 2:
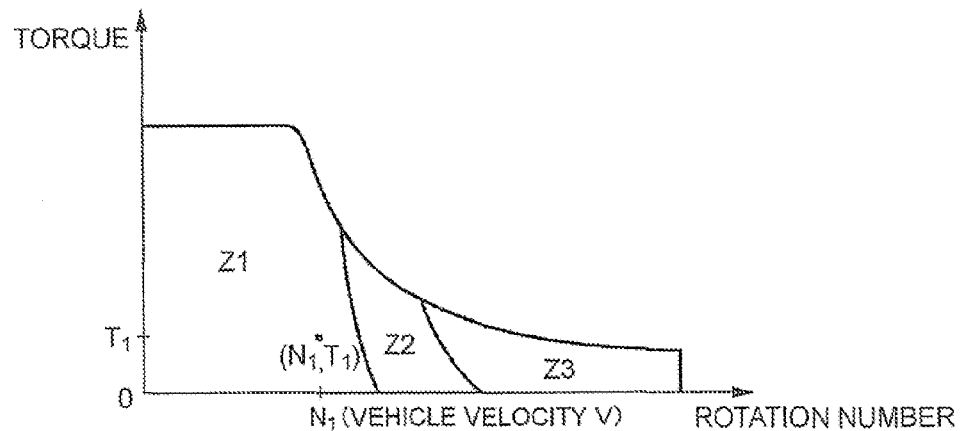
FIG. 2 is a control map diagram for switching the control of a traction motor of the fuel cell system when an inverter command voltage is a predetermined first voltage Va.
Figure 3:
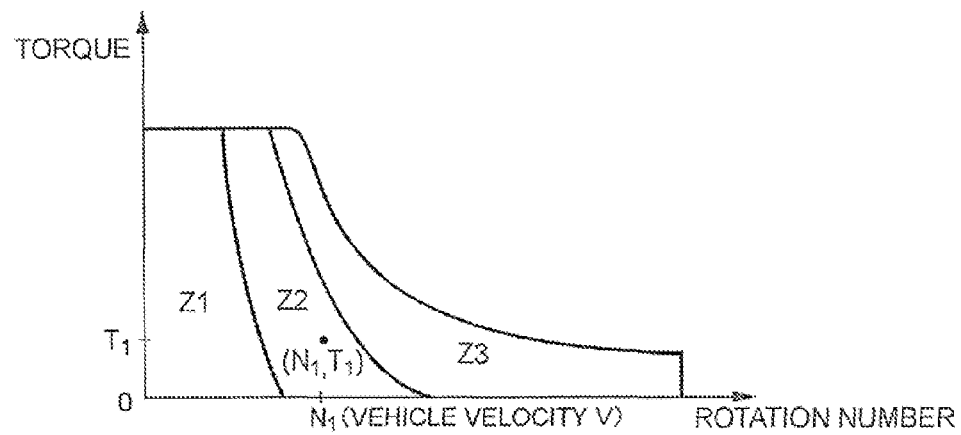
FIG. 3 is a control map diagram for switching the control of the traction motor of the fuel cell system when the inverter command voltage is a predetermined second voltage Vb (with the proviso that Vb>Va)

Furthermore, even in a case where the rotation number and torque of the traction motor 61 are equal (see operation points (N1, T1) in FIGS. 2, 3), when the inverter command voltage is a predetermined voltage or more, the control system switches from the PWM control to the overmodulation control and the rectangular control in this order.

Figure 4:
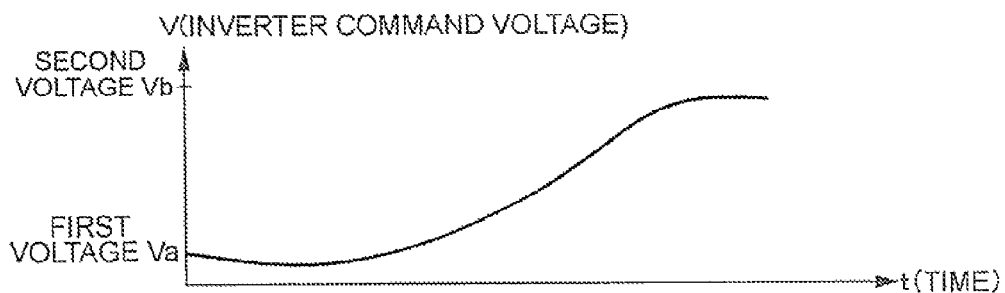
FIG. 4 is a time chart concerning the inverter command voltage in a time chart indicating a relation between the inverter command voltage and a motor control system and a battery power in the fuel cell system.
Figure 5:
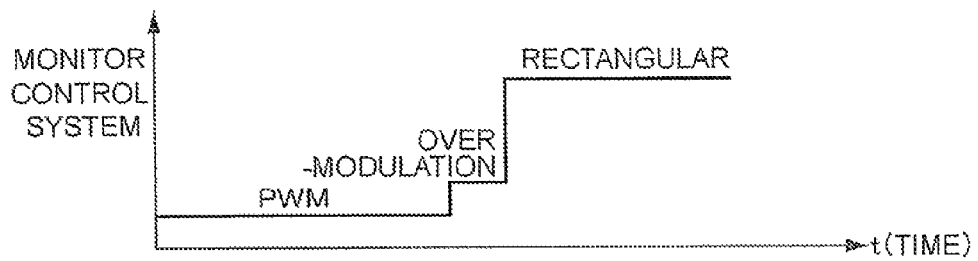
FIG. 5 is a time chart concerning the motor control system in the time chart indicating the relation between the inverter command voltage and the motor control system and the battery power in the fuel cell system.
Figure 6:
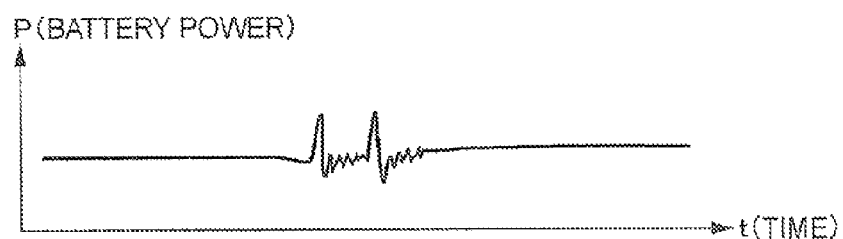
FIG. 6 is a time chart concerning the battery power in the time chart indicating the relation between the inverter command voltage and the motor control system and the battery power in the fuel cell system.

In addition, with the rise of the inverter command voltage shown in FIG. 4, the control system switches as shown in FIG. 5. In this case, a control error increases every time the control system switches. Therefore, the battery power excessively increases or decreases as shown in FIG. 6, thereby causing overcharge/over-discharge. A specific method for avoiding such a disadvantage will be described later in detail.

The DC/DC converter 30 is a full bridge converter constituted of, for example, four power transistors and a drive circuit for exclusive use (not shown). The DC/DC converter 30 has a function of raising or lowering a DC voltage input from the battery 20 to output the voltage to a fuel cell 40 side, and a function of raising or lowering a DC voltage input from the fuel cell 40 or the like to output the voltage to a battery 20 side. Moreover, the functions of the DC/DC converter 30 realize the charge/discharge of the battery 20.

Auxiliary devices 50 such as vehicle auxiliary devices and FC auxiliary devices are interposed between the battery 20 and the DC/DC converter 30. The battery 20 is a power source for these auxiliary devices 50. It is to be noted that the vehicle auxiliary devices are various power devices (e.g., a lighting device, an air conditioning device, a hydraulic pump, etc.) used during the operation of the vehicle, and the FC auxiliary devices are various power devices (a pump for supplying the fuel gas or the oxidizing gas, etc.) used during the operation of the fuel cell 40.

The operations of elements described above are controlled by the control device (a control unit) 10. The control device 10 has a constitution of a microcomputer including a CPU, an ROM and an RAM therein.

The control device 10 controls system parts such as a pressure regulation valve 71 provided in a fuel gas passage, a pressure regulation valve 81 provided in an oxidizing gas passage, the fuel gas supply source 70, the oxidizing gas supply source 80, the battery 20, the DC/DC converter 30 and the inverter 60 based on input sensor signals.

To this control device 10, various sensor signals are input, and examples of the signals include the supply pressure of the fuel gas detected by a pressure sensor 91, the FC voltage of the fuel cell 40 detected by the voltage sensor 92, the FC current of the fuel cell 40 detected by the current sensor 93 and an SOC value indicating a state of charge (SOC) of the battery 20 detected by an SOC sensor 21.

In the present embodiment, even when the charge amount of the battery 20 is limited, for example, the switching frequency of the DC/DC converter 30 is raised, and the energy loss of the DC/DC converter is increased, to securely prevent the voltage of the fuel cell 40 from exceeding a predetermined high-potential avoiding voltage threshold value which is lower than the open voltage of the fuel cell 40.

Next, high-potential avoiding control processing to be intermittently executed by the control device 10 will be described.

The control device 10 calculates a demand power with respect to the fuel cell 40. The demand power is, for example, a power for driving the traction motor 61 and the auxiliary devices 50. Then, the control device 10 calculates the output voltage of the fuel cell 40 corresponding to the demand power by use of a characteristic map indicating I-V characteristics and I-P characteristics (not shown). This characteristic map is obtained by an experiment or the like in advance, and stored in an internal memory 11 of the control device 10 before product shipping. It is to be noted that the value of this characteristic map may be a fixed value or a successively rewritable value.

Then, the control device 10 judges whether or not the output voltage of the fuel cell 40 needs to be forcibly lowered. Specifically, the control device 10 compares the output voltage with a high-potential avoiding target threshold voltage (hereinafter referred to as a threshold voltage Vth), and judges that the output voltage of the fuel cell 40 needs to be forcibly lowered when the output voltage exceeds the threshold voltage Vth. On the other hand, when the output voltage is the threshold voltage Vth or less, the control device judges that the output voltage of the fuel cell 40 does not have to be forcibly lowered.

This threshold voltage Vth is lower than the open voltage of the fuel cell 40, and is obtained by an experiment or the like in advance and stored in the internal memory 11 of the control device 10 before the product shipping or the like. Moreover, the threshold voltage Vth may be a fixed value or a successively rewritable value in accordance with, for example, an ambient environment (an outside air temperature, a fuel cell temperature, a humidity, an operation mode or the like).

In a case where during the above judgment, the control device 10 judges that the output voltage of the fuel cell 40 does not have to be forcibly lowered, control for avoiding the high potential of the fuel cell 40 is not necessary, and hence the processing is completed.

On the other hand, in a case where during the above judgment, the control device 10 judges that the output voltage of the fuel cell 40 needs to be forcibly lowered, the control device performs such control as to forcibly decrease the output voltage of the fuel cell 40 to a value below the threshold voltage Vth. At this time, it is possible to arbitrarily set the value to which the output voltage of the fuel cell 40 is to be forcibly lowered. Then, the control device 10 judges whether or not a surplus power can be absorbed by the battery 20 (i.e., whether or not the power can be charged in the battery 20). Specifically, the control device 10 judges whether or not the surplus power can be absorbed by the battery 20, from the SOC value detected by the SOC sensor 21 or by grasping the remaining capacity of the battery 20.

In a case where the control device 10 judges that the surplus power can be absorbed by the battery 20, the surplus power is absorbed by the battery 20 (charged into the battery 20), and then the processing is completed. On the other hand, in a case where the control device 10 judges that the surplus power cannot be absorbed by the battery 20, for example, the switching frequency of the DC/DC converter 30 is raised, and the energy loss of the DC/DC converter 30 is increased to absorb a surplus power P, thereby completing the processing.

Meanwhile, when the high-potential avoiding control switches from an on-state to an off-state or from the off-state to the on-state during the regeneration of the power to the battery 20 of the traction motor 61, the output voltage of the fuel cell 40 fluctuates, and the control system of the traction motor 61 switches owing to the influence of the fluctuation sometimes. In such a case, the control error or power running regeneration power error of the traction motor 61 increases, and the battery 20 might be overcharged or over-discharged.

Therefore, the control device 10 inhibits the high-potential avoiding control on conditions that the control switching of the traction motor 61 occurs, for example, in a predetermined vehicle velocity region. Specifically, in FIG. 2, when the vehicle velocity is present in the first region Z1, the high-potential avoiding control is beforehand inhibited in a high vehicle velocity region in which the rotation number is not less than a rotation number N1 corresponding to a predetermined vehicle velocity V near the second region Z2. On the other hand, the high-potential avoiding control is allowed in a low or medium vehicle velocity region in which the vehicle velocity is less than the predetermined vehicle velocity V. In a case where it is judged whether or not to allow the high-potential avoiding control in this manner during the power regeneration of the traction motor 61, the overcharge of the battery 20 can be suppressed.

According to the fuel cell system 100 of the present embodiment described above, the high-potential avoiding control is inhibited in the vehicle velocity region of the predetermined vehicle velocity V or more when the control switching of the traction motor 61 occurs. Therefore, in the vehicle velocity region where the control switching of the traction motor 61 occurs, the high-potential avoiding control can be inhibited to suppress the fluctuation of the output voltage of the fuel cell 40, and the control system of the traction motor 61 does not switch owing to the influence of the fluctuation.

In consequence, the increase of the control error of the traction motor 61 can be suppressed, and it is possible to prevent the overcharge of the battery 20, especially the overcharge of the battery 20 during the power regeneration. It is to be noted that the predetermined vehicle velocity V for inhibiting the high-potential avoiding control may vary in accordance with the inverter command voltage.

The invention claimed is:
1. A fuel cell system including:
  a fuel cell which generates a power by an electrochemical reaction between a fuel gas and an oxidizing gas;

a capacitor in which the power generated by the fuel cell is charged;

a motor driven by at least one of the generated power of the fuel cell and the power charged in the capacitor;

an inverter to control the motor in a control system which switches on predetermined conditions;

a converter which raises a voltage input from the capacitor to output the voltage to the motor through the inverter and which lowers a voltage input from the fuel cell to output the voltage to the capacitor; and a control unit programmed to control a converter command voltage and an inverter command voltage, wherein the control unit is programmed to perform high-potential avoiding control to keep the converter command voltage as a high-potential avoiding voltage which is lower than the open voltage of the fuel cell, thereby preventing the total voltage of the fuel cell from exceeding a predetermined high-potential avoiding voltage threshold value, and wherein the control unit is programmed to inhibit the high-potential avoiding control on conditions that the control system of the motor switches.

2. The fuel cell system according to claim 1, wherein the control system of the motor switches in accordance with the rotation number or torque of the motor.

3. The fuel cell system according to claim 2, wherein the control system of the motor further switches in accordance with the inverter command voltage.

4. The fuel cell system according to claim 1, wherein the control unit is programmed to inhibit the high-potential avoiding control when the rotation number of the motor is a predetermined rotation number or more.

5. The fuel cell system according to claim 1, wherein the control unit is programmed to inhibit the high-potential avoiding control when a vehicle velocity is a predetermined vehicle velocity or more.

* * * * *